(12) United States Patent
Shoudou et al.

(10) Patent No.: US 6,244,652 B1
(45) Date of Patent: Jun. 12, 2001

(54) SLIDE DOOR APPARATUS FOR VEHICLE

(75) Inventors: Shingo Shoudou, Hyogo-ken; Hiroshi Miyazaki, Osaka; Kenji Kobashi, Toyota; Ryoichi Fukumoto, Nagoya; Katsuhisa Yamada, Toyota; Masao Ohhashi, Kariya; Shintaro Suzuki, Kasugai, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/455,169

(22) Filed: Dec. 6, 1999

(30) Foreign Application Priority Data

Dec. 7, 1998 (JP) .................................. 10-347649

(51) Int. Cl.⁷ .................................................. B60J 5/06
(52) U.S. Cl. .............................................. 296/155; 49/360
(58) Field of Search ................................ 296/155; 49/360

(56) References Cited

U.S. PATENT DOCUMENTS 6,087,794 * 7/2000 Kawanobe ......................... 49/360 X

FOREIGN PATENT DOCUMENTS 9-317324     9/1997 (JP) .

* cited by examiner

*Primary Examiner*—Joseph D. Pape
*Assistant Examiner*—Patricia Engle
(74) *Attorney, Agent, or Firm*—Burns, Doane, Swecker & Mathis, LLP

(57) ABSTRACT

A vehicular slide door apparatus includes a slide door that is movable along a lengthwise direction of the vehicle body for opening and closing an opening area formed in the lateral side of the vehicle body, a rail secured to the lateral side of the vehicle body to extend in the lengthwise direction of the vehicle body, and a driving device for moving the slide door. The rail possesses first and second side walls and a roller operatively connected to the slide door is slidably fitted in the rail. A guide pipe extends along the rail and is secured to a surface of one of the side walls of the rail to strengthen the rail. A cable passes through the guide pipe in a movable manner and includes one end connected to the driving device and an opposite end connected to the slide door.

12 Claims, 5 Drawing Sheets

SLIDE DOOR APPARATUS FOR VEHICLE

This application is based on and claims priority under 35 U.S.C. §119 with respect to Japanese Application No. 10(1998)-347649 filed on Dec. 7, 1998, the entire content of which is incorporated herein by reference.

FIELD OF THE INVENTION

The present invention generally relates to a vehicle door. More particularly, the present invention pertains to a slide door apparatus for vehicles.

BACKGROUND OF THE INVENTION

A known slide door apparatus is disclosed in Japanese Patent Laid-Open Publication No. Hei. 9-317324. In this apparatus, when an electrically operated driving mechanism is turned on, the resulting rotation of the driving mechanism in one direction moves the slide door in its opening direction, thereby opening the opening area formed in the lateral side of the vehicle body. The resulting rotation of the driving mechanism in the other direction moves the slide door in its closing direction to thereby close the opening area in the lateral side of the vehicle body.

The slide door is supported by rails secured to the vehicle body in such a manner that a roller provided on the slide door moves along each of the rails. A geared wire is interposed between the driving mechanism and the slide door, and this geared wire is pulled and pushed by the driving mechanism to respectively open and close the slide door.

When forces are applied from the driving mechanism to the geared cable for opening and closing the slide door, the horizontal component of the force is transmitted to a side wall of the rail, and this causes a deformation of the side wall of the rail, thereby disturbing or adversely affecting smooth movement of the roller. One proposal for addressing this problem involves reinforcing the side wall of the rail. However, this increases the overall weight of the rail, a result that is not very acceptable due to the desire to utilize vehicle components that are as light as possible.

Accordingly, a need exists for a slide door apparatus for vehicles in which the guide rail, or a side wall of the guide rail, is reinforced without increasing the weight of the rail.

SUMMARY OF THE INVENTION

In light of the foregoing, the present invention provides a vehicular slide door apparatus that includes a slide door movable along the lengthwise direction of the vehicle body for opening and closing an opening area formed in the lateral side of the vehicle body, a rail secured to the lateral side of the vehicle body to extend in the lengthwise direction of the vehicle body, and a driving device for moving the slide door. The rail possesses first and second side walls, and a roller operatively connected to the slide door is slidably fitted in the rail. A guide pipe extends along the rail and is secured to a surface of one of the side walls of the rail to strengthen the rail. A cable passes through the guide pipe in a movable manner and includes one end connected to the driving device and an opposite end connected to the slide door.

According to another aspect of the invention, a vehicular slide door apparatus includes a slide door mounted on a lateral side of a vehicle body for movement in a lengthwise direction of the vehicle body between an open position and a closed position, a supporting device connected to the slide door and provided with at least one roller, and a guide rail provided on the lateral side of the vehicle body and extending in the lengthwise direction of the vehicle body. The roller of the supporting device is slidably positioned in the guide rail. A driving device is provided from moving the slide door, and a guide pipe extends along the guide rail and is fixed to at least a portion of the guide rail. A cable extends through the guide pipe in a movable manner, with one end of the cable being operatively connected to the driving device and the opposite end of the cable being operatively connected to the slide door.

In accordance with another aspect of the invention, a vehicular slide door apparatus includes a slide door mounted on the lateral side of a vehicle body for movement in the lengthwise direction of the vehicle body between an open position and a closed position, at least movable member connected to the slide door, and a rail provided on the lateral side of the vehicle body and extending in a lengthwise direction of the vehicle body. The movable member is supported in the rail for movement along the rail, and a driving device is provided for moving the slide door. A guide pipe extends along the rail and is fixed by welding to at least a portion of the rail. A cable extends through the guide pipe for movement relative to the guide pipe, with one end of the cable being operatively connected to the driving device and the opposite end of the cable being operatively connected to the slide door so that operation of the driving device causes movement of the slide door by way of the cable.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
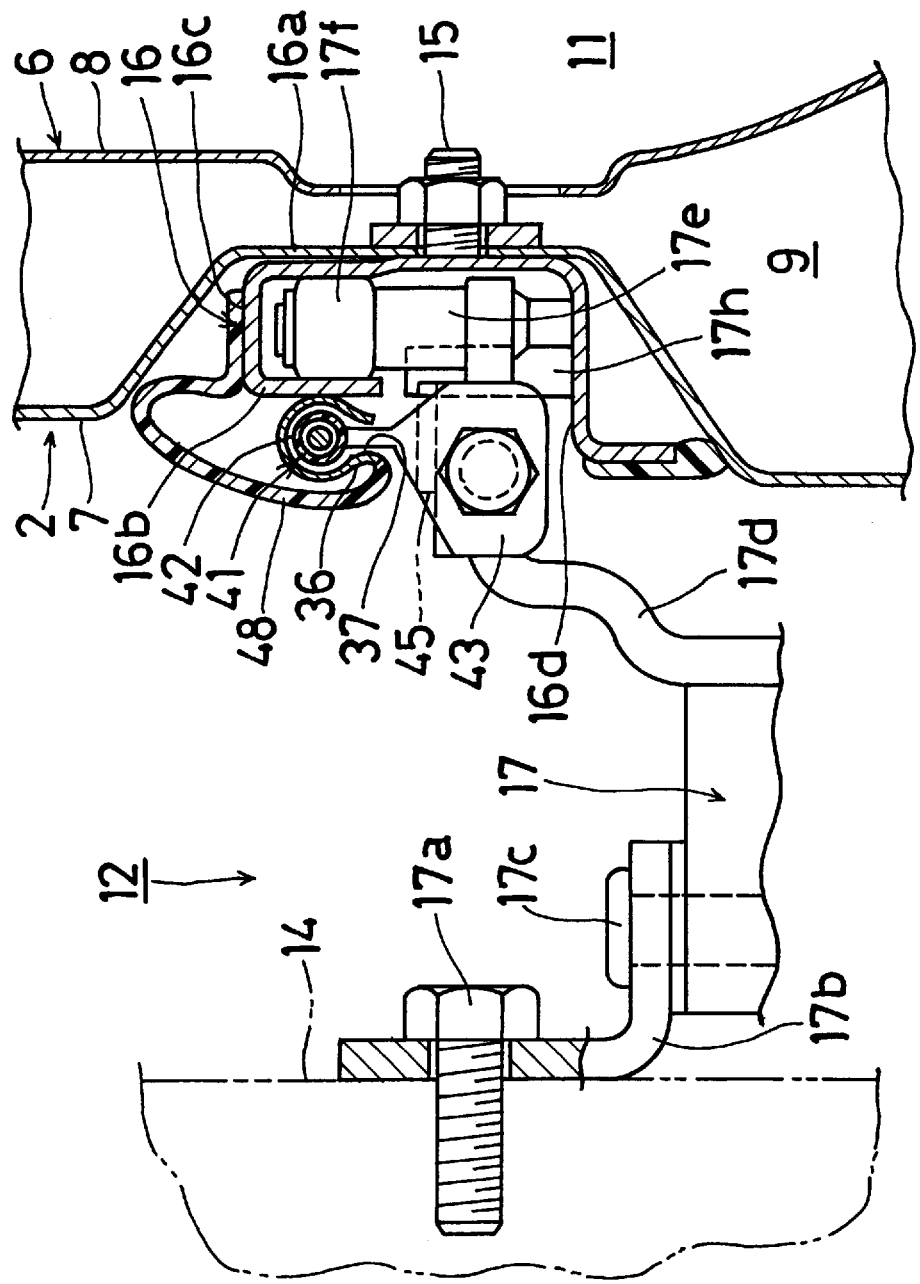
FIG. 1 is a cross-sectional view of a portion of a slide door apparatus in accordance with the present invention taken along the section line 1—1 in FIG. 4.
Figure 2:
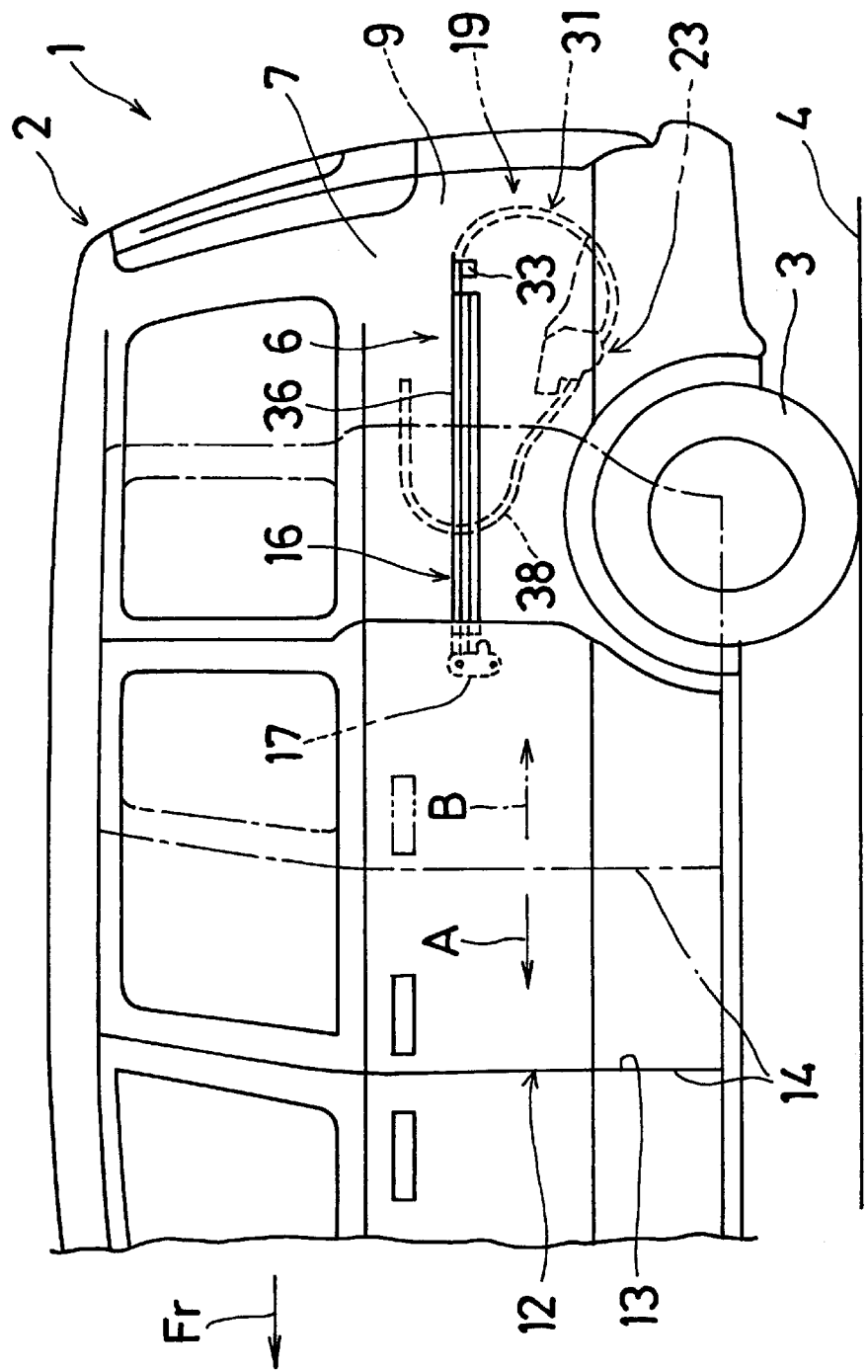
FIG. 2 is a side view of a vehicle body embodying the slide door apparatus according to the present invention.

Referring initially to FIG. 2, a van-type vehicle 1 includes a vehicle body 2 and a pair of front wheels and a pair of rear wheels 3 only one of which is shown in FIG. 2. The vehicle is illustrated as being parked on a road surface 4. The vehicle body 2 also includes a lateral side wall 6. As seen in FIG. 1, the lateral side wall 6 is constructed of two laterally spaced apart panels, an outer panel 7 and an inner panel 8, between which is defined a relatively narrow space 9. The vehicle body 2 encloses an inner space 11 within the vehicle.

The lateral side wall 6 of the vehicle body 2 is provided with an opening area 13 through which one or more persons are able to enter into and exit from the vehicle inner space 11. The lateral side wall 6 of the vehicle body 2 is provided with a slide door device 12 which alternately permits and prevents passengers from entering into and exiting out of the vehicle inner space 11 by opening and closing the opening area 13.

The slide door device 12 includes a slide door 14 which is operable from outside the vehicle, a pair of vertically spaced guide rails 16, 16 (only one of which is shown) which are secured to the outer panel 7 and located at the rear side of the opening area 13, a supporting device 17 movably supported by the rail 16 to guide the slide door 14 along the rail 16, and an electrically operated driving device 19 which is operable to move the slide door 14.

The rail 16 is formed by pressing sheet metal and includes a one-piece main portion which is configured to possess an inverted substantially U-shaped configuration. The main portion of the rail 16 includes laterally spaced apart first and second side plates or side walls 16a, 16b and a connecting plate or connecting wall 16c that connects together the end or top portions of the respective side walls 16a, 16b.

The first side wall 16a which is positioned closest to the outer panel 7 extends generally parallel to the facing portion of the outer panel 7 and is secured to the outer panel 7 by a suitable connecting device 15. The lower end of the first side wall 16a bends outwardly away from the space 9 (i.e., leftward in FIG. 1) to form a support plate or support wall 16d. The support wall 16d is vertically spaced from and located opposite to the connecting plate 16. The support wall 16d terminates in a downwardly extending free end as seen in FIG. 1.

Figure 4:
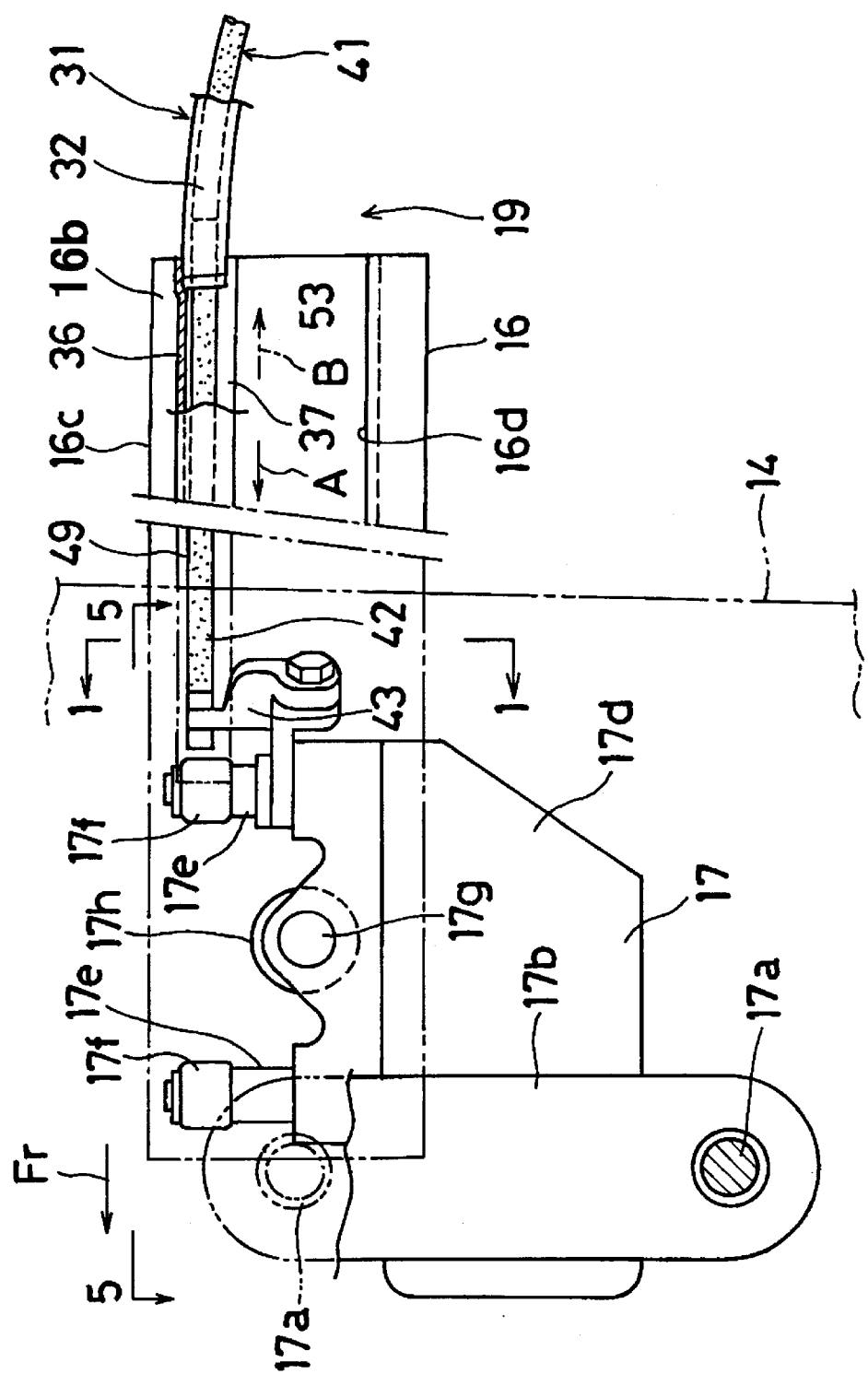
FIG. 4 is a cross-sectional view of a portion of the slide door apparatus of the present invention in the region at which the geared cable is connected to the slide door.
Figure 5:
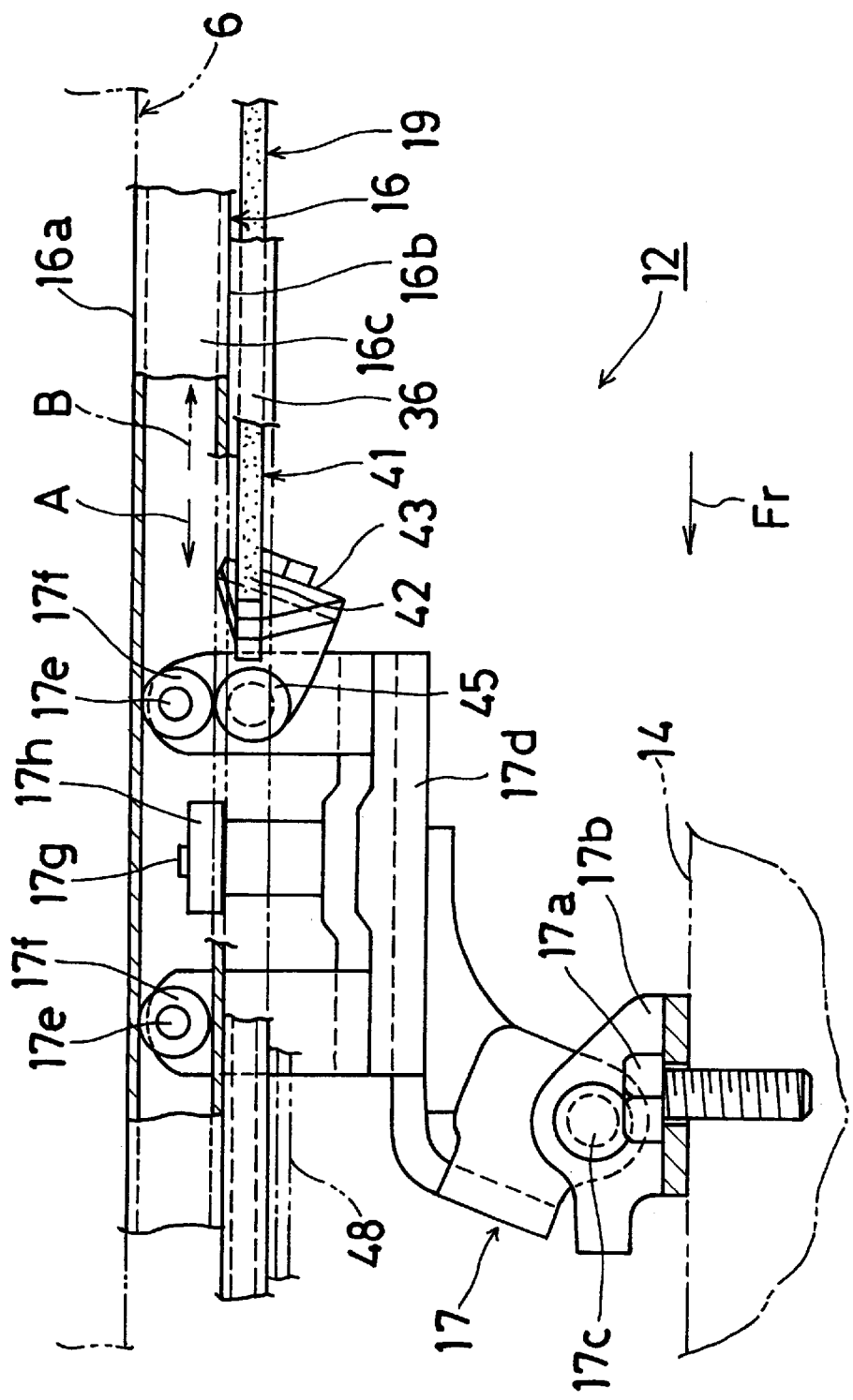
FIG. 5 is a cross-sectional view of a portion of the slide door apparatus of the present invention taken along the section line 5—5 in FIG. 4.

As illustrated in FIGS. 1, 4 and 5, the supporting device 17 includes a first bracket 17b, a second bracket 17d, a pair of lengthwise spaced apart rollers 17f, 17f, and another roller 17h. The first bracket 17b is connected to the inner side (i.e., the right side in FIG. 1) of the slide door 14 by a suitable connecting device 17a. The second bracket 17d is pivotally connected to the first bracket 17b by a vertically extending shaft or pin element 17c so that the second bracket is rotatable in a horizontal plane. The pair of lengthwise spaced rollers 17f, 17f forming a pair of first rollers are rotatably mounted on the second bracket 17d by way of the respective vertically extending shafts 17e, 17e. The other roller 17h forming a second roller is rotatably mounted on a shaft 17g extending from the bracket 17d. The first rollers 17f, 17f are slidably fitted in the rail 16 with substantially perfect precision so as to be free from rattling and are supported to move along the first and second side walls 16a, 16b. The second roller 17h is positioned between the first rollers 17f, 17f and is supported on the support wall 16d. The first and second rollers 17f, 17f, 17h form movable members that are adapted to move along the rail 16.

Each of the first rollers 17f, 17f is slidably held between the first and second side walls 16a, 16b, while the second roller 17h is slidably supported on the support wall 16d. By virtue of this construction, the support device 17 is slidably movable along the rail 16. The support device 17 allows sliding movement of the slide door 14 along the outer surface of the outer panel 17 in the vehicle lengthwise direction (i.e., front direction A shown in FIG. 2 or the rear direction B shown in FIG. 2). The slide door 14 is movable between a fully closed position depicted in full line in FIG. 2 and a fully opened position. The slide door 14 is also positionable in a midway opened position which is depicted by the one dotted outline shown in FIG. 2.

Figure 3:
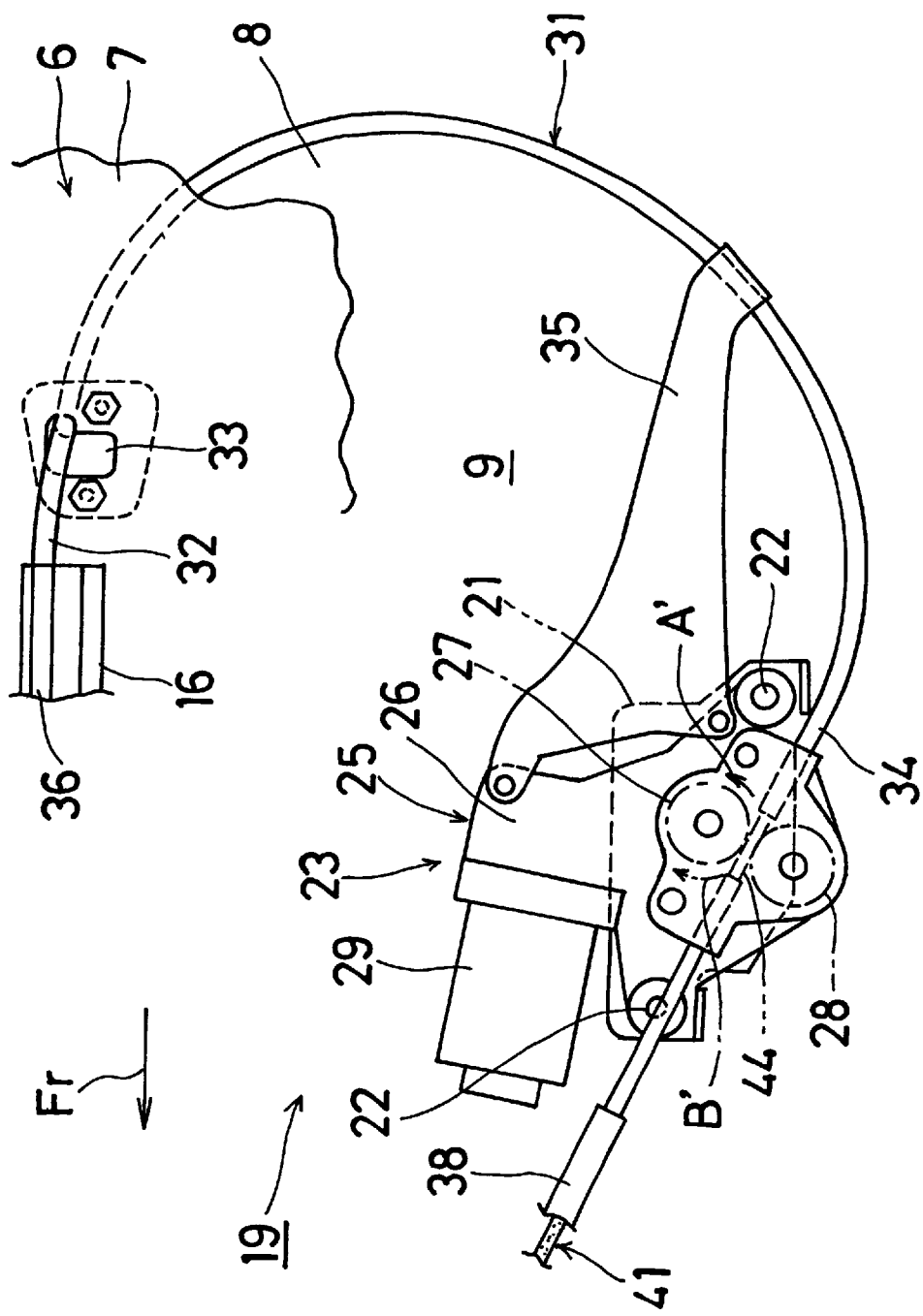
FIG. 3 is an enlarged view of a portion of the vehicle body shown in FIG. 2 in the vicinity of the driving mechanism.

Referring to FIG. 3, the driving device 19 includes a metal supporting member 21 in the form of a plate and a driving unit 23 supported on the supporting member 21 by a pair of lengthwise spaced apart connecting devices 22, 22. The driving unit 23 is a driving source for moving the slide door 14. The supporting member 21 and the driving unit 23 are accommodated in the space 9 between the outer panel 7 and the inner panel 8.

The driving unit 23 includes a casing 26 forming an outer shell of a unit main body 25, an output gear 27 journaled in the casing 26, a rear force receiving gear 28 journaled in the casing 26 in opposing relation to the gear 27, and an electric motor 29 secured to the casing 26 for rotating the output gear 27 in the directions indicated by the arrows A' and B'.

The control device 19 also includes a guide pipe 31 having a generally circular cross-section. This guide pipe 31 is made of a material, preferably steel, having significant strength for purposes that will become apparent from the description below. One end 32 of the guide pipe 31 extends from the space 9 between the inner and outer panels 8, 7 through an opening 33 formed in the outer panel 7. The opposite end 34 of the guide pipe 31 is connected to the casing 26 of the driving unit 23.

The guide pipe 31 is bent in the midpoint portion of its length to define a curved or acuate shaped pipe when viewed from the vehicle side. The pipe 31 is supported by a supporting arm 35 that is secured to the casing 26.

The driving device 19 further includes another guide pipe 36 which extends along the rail 16. The properties of the second guide pipe 36 are identical to those of the first guide pipe 31. The second guide pipe 36 is advantageously secured, preferably by welding, to at least a portion of the lengthwise extent of the guide rail 16, thus causing the second guide pipe 36 to be supported by the guide rail 16. The second guide pipe 36 is preferably fixed to at least one-half of the entire lengthwise extent of the second side wall 16b of the guide rail 16. In a particularly preferred form of the present invention, the second guide pipe 36 is fixedly secured, preferably by way of welding, to the entire lengthwise extent of the second side wall 16b of the guide rail 16. This fixation of the second guide pipe 36 to the entire lengthwise extent of the rail 16 (the second side wall 16b of the rail 16) or at least a portion of the lengthwise extent of the rail 16 is advantageous from the standpoint of reinforcing and strengthening the rail 16. The second guide pipe 36 is immovably secured to the outer surface of the second side wall 16b (i.e. the surface of the second side wall 16b facing towards the first side wall 16a). The rear portion of the second guide pipe 36 is fitted in a detachable manner with one end 32 of the first guide pipe 31 as shown in FIG. 4. The bottom end portion of the second guide pipe 36 is also provided with a full-length slit 37 as shown in FIG. 4.

Referring to FIG. 3, the opposite end 34 of the first guide pipe 31 is positioned in opposition to one end of a flexible third guide pipe 38 which may be made of resin. As illustrated in FIG. 2, the third guide pipe 38 extends from the first guide pipe 31 and is bent in a curved manner. The end of the third guide pipe 38 positioned remote from the end that opposes the first guide pipe 31 is secured to the inner panel 8 of the side wall 6. The third guide pipe 38 possesses a generally flat or elliptically shaped cross-section.

The driving device 19 further includes a geared cable 41 which passes through the guide pipes 31, 36, 38 in a slidable manner. As illustrated in FIG. 4, one end 42 of the geared cable 41 is connected to the upper end portion of a connecting device 43 which passes through the slit 37 of the second guide pipe 36. The lower end portion of the connecting device 43 is pivoted to the second bracket 17d of the support device 17 by a vertically extending shaft 45 so as to be rotatable in a horizontal plane. Thus, one end 42 of the geared cable 41 is connected to the slide door 14 by way of the connecting device 43 and the support device 17.

Within the casing 26 of the driving unit 23, between the one end 34 of the first guide pipe 31 and one end of the third guide pipe 38, a portion of the geared cable 41 in the region 44 is in meshing engagement with both the output gear 27 and the reaction force receiving gear 28. The cable 41 is thus operatively connected to the driving device 19.

When the motor 29 is turned on so that its output shaft rotates in one direction, the resulting rotation rotates the output gear 27 in the direction A' to move the cable 41 in the frontward direction A, thus causing closing movement of the slide door 14 such that the rollers 17f, 17f, 17h roll along the rail 16. When the motor 29 is turned on so that its output shaft rotates in the opposite direction, the resulting rotation rotates the output gear 27 in the direction B' to move the cable 41 in the rearward direction B, thus causing opening movement of the slide door 14 through rolling movement of the rollers 17f, 17f, 17h along the rail 16.

With the door slide device constructed according to the present invention, the relatively strong metal guide pipe 36 is secured along substantially the full length of the side wall 16b of the rail 16, thus advantageously reinforcing the side wall 16b of the guide rail 16 to which external forces are applied from the rollers 17f, 17f which extend in the vehicle lateral direction. Thus, the rail 16 is strengthened and not as susceptible to deformation caused by the forces from the respective rollers 17f, 17f. As a result, smooth movement of the respective rollers 17f, 17f is ensured, thereby establishing smooth overall movement of the slide door 14.

It is to be noted that the second guide pipe 36 through which the geared cable 45 passes is an existing element of the slide door apparatus which means that no additional reinforcing member is required to provide the advantageous strengthening of the rail 16 associated with the present invention.

In addition, the reinforcement of the side wall 16b of the rail 16 by the second guide pipe 36 causes the strength of the side wall 16b to be generally equal to that of the side wall 16a, thus resulting in a balancing of the reinforcement between the side walls 16a, 16b.

The reinforcement provided by the present invention is achieved by utilizing the guide pipe 36 having a circular cross-section which is quite effective as compared to reinforcement provided in the form of a rib.

As an alternative to the inverted generally U-shaped rail 16, it is also possible to employ an upstanding or a mere U-shaped rail 16. The rail 16 and the second guide pipe 36 are preferably concealed from the outside by a garnish or ornamental portion 48, thereby providing an attractive overall appearance of the vehicle body 2.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vehicular slide door apparatus comprising:
    a slide door movable along a lengthwise direction of a vehicle body for opening and closing an opening area formed in a lateral side of the vehicle body;
    a rail having a substantially U-shaped cross-section possessing a first side wall and a second side wall, the rail being secured to the lateral side of the vehicle body to extend in a lengthwise direction of the vehicle body, the first side wall being secured to the lateral side of the vehicle body;
    a roller slidably fitted in the rail;
    a driving device provided on the vehicle body;
    a guide pipe extending along the rail and secured to an outer surface of the second side wall that faces away from the first side wall; and
    a cable passing through the guide pipe in a movable manner, one end of the cable being connected to the driving device and an opposite end of the cable being connected to the slide door.

2. A vehicular slide door apparatus as set forth in claim 1, wherein the first and second side walls are positioned in opposing relation to one another.

3. A vehicular slide door apparatus as set forth in claim 1, wherein the roller forms part of a supporting device that is connected to the slide door.

4. A vehicular slide door apparatus as set forth in claim 1, wherein said guide pipe is secured to the outer surface of said second side wall of the rail by welding.

5. A vehicular slide door apparatus as set forth in claim 1, including a guide element extending from the driving device to the guide pipe, one end of said guide element being detachably connected to one end of said guide pipe, said cable passing through the guide element in a slidably movable manner.

6. A vehicular slide door apparatus comprising:
    a slide door mounted on a lateral side of a vehicle body for movement in a lengthwise direction of the vehicle body between an open position and a closed position;
    a supporting device connected to the slide door, said supporting device including at least one roller;
    a guide rail provided on the lateral side of the vehicle body and extending in a lengthwise direction of the vehicle body, said at least one roller being slidably positioned in the guide rail, the guide rail including a first side wall secured to the lateral side of the vehicle body and a second side wall positioned in facing relation to the first side wall;
    a driving device;
    a guide pipe extending along the guide rail and secured to the second side wall; and
    a cable extending through the guide pipe for moving relative to the guide pipe, one end of the cable being operatively connected to the driving device and an opposite end of the cable being operatively connected to the slide door.

7. A vehicular slide door apparatus as set forth in claim 6, wherein the supporting device includes a pair of rollers slidably positioned in the guide rail.

8. A vehicular slide door apparatus as set forth in claim 6, wherein said guide rail extends over a lengthwise extent, said guide pipe being secured to the guide rail along substantially the entire lengthwise extent of the guide rail.

9. A vehicular slide door apparatus as set forth in claim 6, including a guide element extending from the driving device to the guide pipe, one end of said guide element being detachably connected to one end of said guide pipe, said cable passing through the guide element in a slidably movable manner.

10. A vehicular slide door apparatus comprising:

a slide door mounted on a lateral side of a vehicle body for movement in a lengthwise direction of the vehicle body between an open position and a closed position;

at least movable member connected to the slide door;

a rail provided on the lateral side of the vehicle body and extending in a lengthwise direction of the vehicle body, said at least one movable member being supported in the rail for movement along the rail, the rail including a first side wall secured to the lateral side of the vehicle body and a second side wall positioned in facing relation to the first side wall;

driving device;

a guide pipe extending along the rail and welded to the second side wall to fix the guide pipe to the second side wall; and a cable extending through the guide pipe for moving relative to the guide pipe, one end of the cable being operatively connected to the driving device and an opposite end of the cable being operatively connected to the slide door so that operation of the driving device causes movement of the slide door by way of the cable.

11. A vehicular slide door apparatus as set forth in claim 10, wherein said rail extends over a lengthwise extent, said guide pipe being welded to the rail along substantially the entire lengthwise extent of the rail.

12. A vehicular slide door apparatus as set forth in claim 10, wherein said at least one movable member is a roller forming a part of a supporting device, said supporting device including at least one bracket, said roller being connected to the slide door by way of said at least one bracket.

* * * * *